United States Patent Office 2,972,476
Patented Feb. 21, 1961

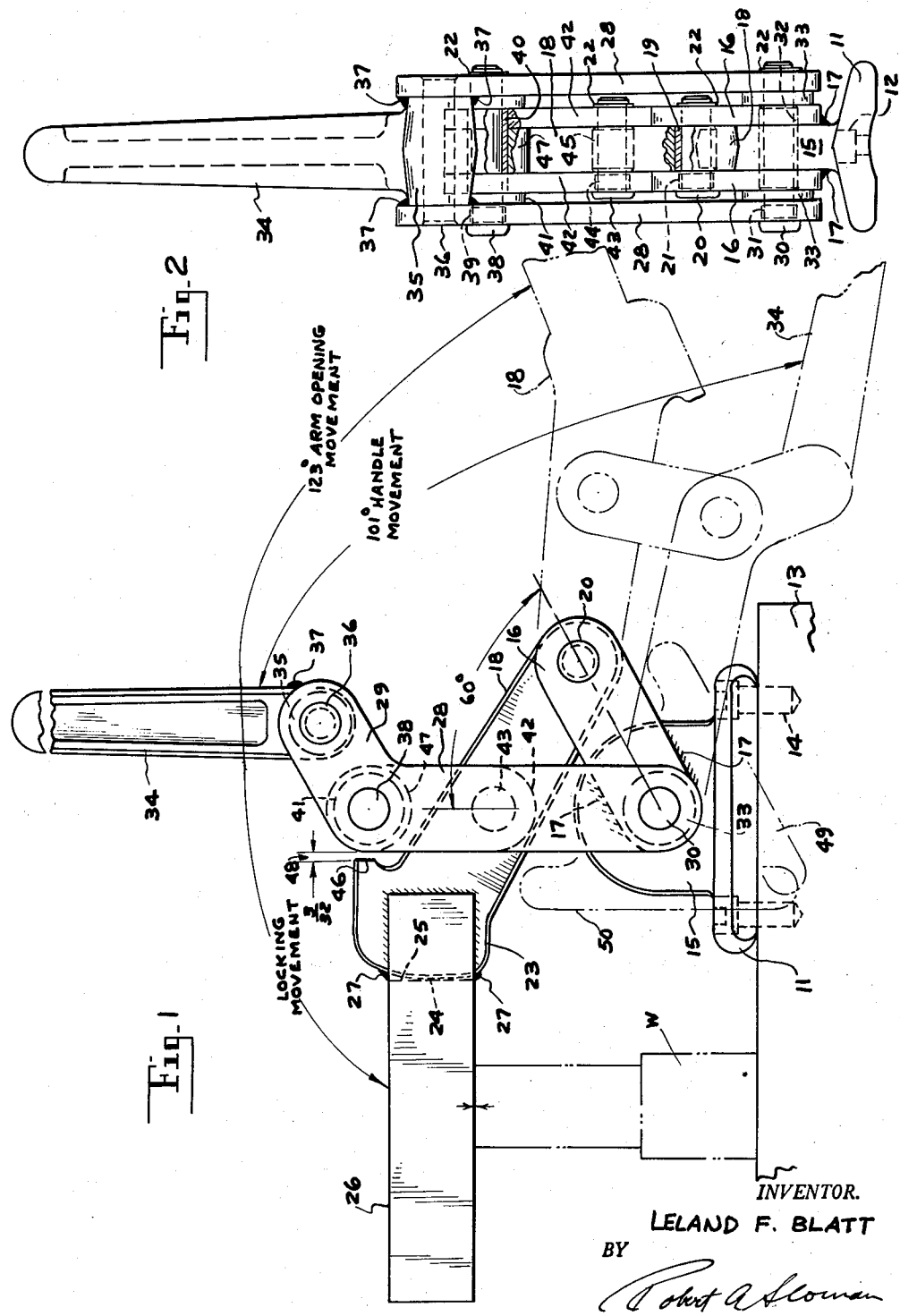

2,972,476
UNIVERSAL TOGGLE CLAMP
Leland F. Blatt, Grosse Pointe Woods, Mich.
(22930 Sherwood, Warren, Mich.)
Filed Sept. 4, 1959, Ser. No. 838,319
4 Claims. (Cl. 269—145)

This invention relates to a universal toggle clamp.

It is the object of the present invention to provide a novel toggle clamp assembly adapted for securing upon a support and including a holddown arm for securing a workpiece on said support.

It is an object of this invention to provide a novel linkage and pivotal mounting for the holddown arm and its connecting arm lever upon a fixed base, together with a novel mounting of a pair of control links and connected handle upon said base for swinging movements thereon together with a linkage between the control links and said arm lever.

It is another object of this invention to construct the holddown arm and arm lever assembly such that the arm lever may be angularly adjusted with respect to the longitudinal axis of the holddown arm as desired and fixedly secured thereto before assembly.

It is another object to provide for angular adjustment between the handle and the upper ends of the offset control links and the fixedly securing thereof before assembly.

It is a further object to provide a novel universal toggle clamp assembly wherein the handle movement may be within the range of 101 degrees approximately with the arm having a maximum opening movement of 123 degrees approximately.

It is a further object of providing an adjustable relationship between the base links and the base of the clamp after which the same are fixedly secured together before assembly, to provide means of varying the relative position of the base links with relation to the base to provide unlimited styles of clamps taking into consideration the above objects relative to the adjustable positioning of the handle with respect to the control links and the holddown arm with respect to the arm lever.

These and other objects will be seen from the following specification and claims in conjunction with appended drawing in which:

Fig. 1 is a fragmentary side elevational view of the present universal toggle clamp.

Fig. 2 is an end elevational view thereof, partially broken away and sectioned.

It will be understood that the above drawing illustrates merely a preferred embodiment of the invention and that other embodiments are contemplated within the scope of the claims hereafter set forth.

Referring to the drawing, the present universal toggle clamp includes unitary base 11 with a pair of transverse apertures 12 adjacent its opposite ends to receive screws 14 for fixedly securing said base upon a suitable support 13. Mounting boss 15, upright in the present embodiment, projects from base 11 and is a fixed part thereof.

A pair of spaced base links 16 are arranged upon opposite sides of boss 15, extending upwardly at an acute angle with respect to said base and fixedly secured to said boss by welds 17. In the present embodiment, for illustration, the angle is 30 degrees.

Arm lever 18 is interposed at its lower end between base links 16 at their free ends and is pivotally mounted thereon. For this purpose the preferably steel bushing 19 is pressed through a corresponding aperture in arm lever 18 and a headed spline torque pin 20 is projected through base links 16 and bushing 19.

The projecting end of pin 20 is secured with respect to one of said base links by the conventional snap ring 22. Pin 20 has a circularly arranged set of splines 21 which are pressed or fixedly projected through the other of the base links 16 to establish an immovable relationship. Accordingly arm lever 18 pivots with respect to stationary pin 20 to thus minimize wear in view of bushing 19.

The upper portion of arm lever 18 terminates in the forwardly extending end 23 whose front edge 24 is arcuate for relative angular positioning within the slotted end 25 of holddown arm 26, which, in the preferred embodiment, is square in cross section. Arm lever 18 is fixedly secured, after the desired adjustment with respect to arm 26, by welds 27.

In the preferred embodiment shown in Fig. 1, holddown arm 26 is disposed above and parallel to support 13 for the purpose of retainingly engaging the upright workpiece W upon said support. The downward retaining thrust, with the toggle clamp locked, between arm 26 and the work is indicated by the opposing arrows in Fig. 1.

A pair of upright control links 28 with upwardly inclined lateral offsets 29 at their upper ends are pivotally mounted at their lower ends by headed spline torque pin 30. Said pin extends through control links 28, the respective spacers 33, and the transverse preferably steel bushing 32 which extends through boss 15 and the adjacent base links 16.

Pin 30 also has a plurality of splines 31 at one end for securing engagement with one of control links 28. The free end of said pin is fixedly secured with respect to the other control link by the conventional snap ring 22.

Upright handle 34 at one end has an enlarged transverse boss 35 which is apertured. Said boss is positioned between the free ends of the control link offsets 29, pivotally mounted thereon and joined thereto by transverse rivet 36 which extends through and is secured to offsets 29.

One of the advantages of the present invention is that the handle 34 may be angularly adjusted as desired with respect to the longitudinal axes of offsets 29, after which and before final assembly, said handle is fixedly secured to the said offsets by welds 37.

Thus a unitary relationship is established between handle 34 and the upper ends of control links 28, whose lower ends are pivotally mounted at 30 upon the base of the toggle clamp. The handle has a releasing movement of approximately 101 degrees to the dotted line position shown.

The above described holddown arm 26 and arm lever 18 is similarly pivoted at 20 with respect to the fixed base links 16; and in operation is adapted to swing about said pivot through an arc of as much as 123 degrees approximately, as indicated by the fragmentarily dotted line positioning of said arm lever.

A control linkage is now provided between the pivotal control links 28 and the arm lever 18. For this purpose, a pair of arm lever links 42 arranged in an upright position in the present embodiment, are positioned upon opposite sides of arm lever 18, with an apertured spacer 47 interposed between their upper ends.

The headed spline torque pin 38 projects through upper portions of control links 28 and through the hardened steel bushing 40 which projects through the upper ends of arm lever links 42 and through spacer 47.

A series of splines 39 are arranged at one end of pin 38 for frictionally securing to one of the control links 28. Apertured spacers 41 are respectively positioned upon pin 38 between the control links and the arm lever links 42. The free end of pin 38 extends through the other control link 28 and is secured thereto by a conventional snap ring 22.

A transverse headed spline torque pin 43 extends through the lower ends of arm lever links 42 and through another hardened bushing 45 secured through an intermediate portion of arm lever 18. Here also pin 43 has a series of splines 44 fixedly securing said pin to one of the arm lever links. The free end of said pin extends through the other arm lever link and is retained with respect thereto by the conventional snap ring 22.

The end 23 of arm lever 18 has a rearwardly extending boss across its upper rear portion including a flattened upright stop surface 46. In the position shown stop surface 46 is spaced as at 48 a distance of approximately 3/32 of an inch for example, with respect to spacer 47. This represents the locking movement of the control links 28 from the position shown in Fig. 1, by which the holddown arm 26 is secured in locking position relative to workpiece W.

The toggle action is such that pivot pin 38 moves past dead center the distance of said locking movement with respect to the pivotal connections 43 and 30; in other words past dead center with respect to the pivotal mounting of the lower ends of arm lever links 42 and the pivotal mounting of control links 28.

The dotted line illustration 49 of base 11 is for the purpose of showing the versatility of the present assembly and particularly the fact that base links 16 may be angularly adjusted with respect to the base 11, so that said links are actually parallel to its bottom surface as shown at 49. Alternately any other suitable angle may be achieved after which the said links are secured by welds 17.

The base may also be initially located in an upright position as shown in dotted lines at 50, and the base links 16 may be secured thereto in any desired angular position, such as shown in Fig. 1.

The present invention thus provides a smooth acting quick opening universal toggle clamp with an arm movement of approximately 123 degrees. An additional arm opening movement of 103 degrees can be achieved by altering the sides of the base to provide linkage clearance.

The offset linkage design 29 provides ample clearance of operating handle 34 as a safety feature.

Having described my invention, reference should be had to the following claims.

I claim:

1. A toggle clamp comprising a base adapted for securing on a support, a mounting boss projecting from said base, a pair of spaced base links fixedly joined at their one ends to said boss and extending angularly upward therefrom, an arm lever interposed at one end between said base links at their free ends and pivotally mounted thereon, said arm lever extending angularly upward past said boss, a holddown arm disposed above and parallel to said support and fixedly secured at one end to the free end of said arm lever, for securing a workpiece upon said support, a pair of upright control links pivotally mounted at their lower ends upon said boss, a handle fixedly joined to and between the free ends of said control links, and a pair of upright spaced arm lever links on opposite sides of said arm lever pivotally connected at their lower ends to said arm lever intermediate its ends and at their upper ends pivotally connected to upper portions of said control links, arcuate movement of said handle and connected control links upon said boss transmitting through said arm lever links corresponding arcuate movements of said holddown arm and connected arm lever about its pivotal mounting upon said base links, the pivotal mounting of said upright control links including a bushing snugly extending through said boss and base links, spacers between said base links and control links respectively, a headed torque pin projected through the lower ends of said control links, spacers and bushing, and means engaging the other control link retainingly securing said pin in assembled relation.

2. A toggle clamp comprising a base adapted for securing on a support, a mounting boss projecting from said base, a pair of spaced base links fixedly joined at their one ends to said boss and extending angularly upward therefrom, an arm lever interposed at one end between said base links at their free ends and pivotally mounted thereon, said arm lever extending angularly upward past said boss, a holddown arm disposed above and parallel to said support and fixedly secured at one end to the free end of said arm lever, for securing a workpiece upon said support, a pair of upright control links pivotally mounted at their lower ends upon said boss, a handle fixedly joined to and between the free ends of said control links, and a pair of upright spaced arm lever links on opposite sides of said arm lever pivotally connected at their lower ends to said arm lever intermediate its ends and at their upper ends pivotally connected to upper portions of said control links, arcuate movement of said handle and connected control links upon said boss transmitting through said arm lever links corresponding arcuate movements of said holddown arm and connected arm lever about its pivotal mounting upon said base links, the securing of said holddown arm to said arm lever consisting of the end of said holddown arm being transversely slotted, the upper end of said arm lever projected into said slotted end and angularly adjusted therein with respect to the longitudinal axis of said arm, and a series of welds fixedly securing the end of said arm lever to said arm.

3. A toggle clamp comprising a base adapted for securing on a support, a mounting boss projecting from said base, a pair of spaced base links fixedly joined at their one ends to said boss and extending angularly upward therefrom, an arm lever interposed at one end between said base links at their free ends and pivotally mounted thereon, said arm lever extending angularly upward past said boss, a holddown arm disposed above and parallel to said support and fixedly secured at one end to the free end of said arm lever, for securing a workpiece upon said support, a pair of upright control links pivotally mounted at their lower ends upon said boss, a handle fixedly joined to and between the free ends of said control links, and a pair of upright spaced arm lever links on opposite sides of said arm lever pivotally connected at their lower ends to said arm lever intermediate its ends and at their upper ends pivotally connected to upper portions of said control links, arcuate movement of said handle and connected control links upon said boss transmitting through said arm lever links corresponding arcuate movements of said holddown arm and connected arm lever about its pivotal mounting upon said base links, the connection of said handle with the upper ends of said control links consisting of a transverse enlarged apertured boss at one end of said handle, adjustably positioned angularly between the upper ends of said control links, a rivet retainingly extending through said links and boss, and welds fixedly securing said handle in adjusted position to said control links.

4. A toggle clamp comprising a base adapted for securing on a support, a mounting boss projecting from said base, a pair of spaced base links fixedly joined at their one ends to said boss and extending angularly upward therefrom, an arm lever interposed at one end between said base links at their free ends and pivotally mounted thereon, said arm lever extending angularly upward past said boss, a holddown arm disposed above and parallel to said support and fixedly secured at one end to the free end of said arm lever, for securing a workpiece upon said support, a pair of upright control links pivotally mounted at their lower ends upon said boss, a handle fixedly joined to and between the free ends of said control links, and a pair of upright spaced arm lever links on opposite sides of said arm lever pivotally connected at their lower ends to said arm lever intermediate its ends and at their upper ends pivotally connected to upper portions of said control links, arcuate movement of said handle and connected control links upon said boss transmitting through said arm lever links corresponding arcuate movements of said holddown arm and connected arm lever about its pivotal mounting upon said base links, a spacer between the upper ends of said arm lever links, a transverse boss on the upper end of said arm lever extending rearwardly thereof, normally spaced from said spacer, the pivotal connection of the upper ends of said arm lever links moving past dead center with respect to the pivotal connection of the lower ends of said arm lever links with said arm lever and the pivotal mounting of said control links, with said spacer engaging said latter boss for locking said holddown arm in work-securing position.

References Cited in the file of this patent

UNITED STATES PATENTS

| | | |
|---|---|---|
| 1,622,487 | Breton | Mar. 29, 1927 |
| 1,997,428 | Olson | Apr. 9, 1935 |